(12) United States Patent
Carlson

(10) Patent No.: US 6,181,522 B1
(45) Date of Patent: Jan. 30, 2001

(54) READ/WRITE HEAD WITH A GIMBAL BALL ASSEMBLY

(75) Inventor: Carl J. Carlson, Pleasanton, CA (US)

(73) Assignee: Read-Write Corporation, Fremont, CA (US)

( * ) Notice: Under 35 U.S.C. 154(b), the term of this patent shall be extended for 0 days.

(21) Appl. No.: 09/210,532

(22) Filed: Dec. 12, 1998

(51) Int. Cl.$^7$ ........................................................ G11B 5/48
(52) U.S. Cl. ........................................................ 360/245.1
(58) Field of Search ............................ 360/234.6, 244.2, 360/245, 245.1, 245.2, 245.3, 245.4; 29/603.03

(56) References Cited

U.S. PATENT DOCUMENTS

| | | | |
|---|---|---|---|
| 4,141,050 | * | 2/1979 | Wiseley .............................. 360/245.3 |
| 5,079,660 | * | 1/1992 | Yumura et al. .................... 360/245.1 |
| 5,493,463 | * | 2/1996 | Hagen ................................ 360/245.3 |

FOREIGN PATENT DOCUMENTS 6-89417 * 3/1994 (JP) .

* cited by examiner

Primary Examiner—David L. Ometz
(74) Attorney, Agent, or Firm—Samuel A. Kassatly

(57) ABSTRACT

A head gimbal assembly (HGA) allows gimbaling along pitch and roll axes, and utilizes an inexpensive spherical gimbal ball pressed into an etched hole in the load beam to provide a highly accurate and measurable pivot location of a slider. The head gimbal assembly includes a suspension of the type supporting a slider, and comprising the suspension. A gimbal opening is formed in the load beam, and extends therethrough so that it receives the spherical gimbal ball for attachment to the load beam. A resilient flexure is secured to the load beam and supports the slider. The backside of the gimbal ball remains visible for the option of optical bonding of the slider to the suspension and for measurement of the slider position relative to the gimbal ball subsequent to the assembly of the HGA. The backside of the gimbal ball can optionally be used as the mechanical datum to accurately bond the suspension to the slider.

18 Claims, 11 Drawing Sheets

READ/WRITE HEAD WITH A GIMBAL BALL ASSEMBLY

BACKGROUND OF THE INVENTION

1. Field of the Invention

The present invention relates to data storage devices such as disk drives. The invention particularly relates to a load beam that allows gimbaling along pitch and roll axes, and that utilizes an inexpensive spherical gimbal ball pressed into an etched hole in the load beam to provide a highly accurate and measurable pivot location of a slider.

2. Description of Related Art

In a conventional disk drive, a read/write head is secured to a rotary actuator magnet and a voice coil assembly by means of a suspension and an actuator arm, and is positioned over a surface of a data storage disk. In operation, a lift force is generated by the aerodynamic interaction between the head and the disk. The lift force is opposed by a counteracting spring force applied by the suspension, such that a predetermined flying height is maintained over a full radial stroke of the rotary actuator assembly above the surface of the disk.

The suspension includes a load beam and a flexure secured to a cantilevered end of the load beam. A slider is mounted to the flexure. The flexure provides a proper pivotal connection for the slider so that during operation, the slider can compensate for irregularities in the disk drive manufacture and operation, by pitching and/or rolling slightly in order to maintain the air bearing, while maintaining appropriate stiffness against yaw movement. Roll is defined as the rotation about an axis extending directly out from the actuator arm through the pivot contact point and parallel to the X-Y plane of the disk. Pitch is defined as rotation about an axis perpendicular to the roll axis through the pivot contact point and parallel to the X-Y plane of the disk. Yaw is gyration around an axis perpendicular to the air-bearing surface. The flexure has to achieve low enough pitch and roll stiffness for the air bearing flying height tolerances while at the same time achieving high enough yaw stiffness for track seeking.

Exemplary suspension designs are illustrated by the following references:

U.S. Pat. No. 5,786,961 to Goss;
U.S. Pat. No. 5,675,454 to Hatanai et al.;
U.S. Pat. No. 5,572,385 to Kuwamoto;
U.S. Pat. No. 5,504,640 to Hagen;
U.S. Pat. No. 5,381,288 to Karam, II;
U.S. Pat. No. 4,811,143 to Ohashi et al.;
U.S. Pat. No. 4,017,898 to Toombs et al.;
U.S. Pat. No. 3,422,412 to Linsley;
U.S. Pat. No. 3,403,388 to Linsley;
U.S. Pat. No. 3,202,772 to Thomas, Jr.;
U.S. Pat. No. 3,183,810 to Sampson; and
U.S. Pat. No. 3,158,847 to Pulkrabek.

In some conventional suspensions, the flexure includes a dimple that abuts against the load beam. In other suspensions, the dimple is formed in the load beam and pushes against the flexure. In these conventional suspensions, the dimple can be formed by stamping either the flexure or the load beam.

A stamped dimple presents several shortcomings, a few of which are mentioned herein. The dimple stamping process is necessarily separate from the process of etching the reference datum holes in the load beam or flexure. Stamping tooling accuracy causes variation between the datum holes and the stamped dimple. Additional variation is added in the case of flexures with stamped dimples when aligning/welding the flexure to the load beam. Further variance occurs when locating/aligning the mount plate to the load beam. Print tolerance shows a boss outer diameter to the load beam hole to be approximately in the range of ±0.0015 inch. Yet more variations exist between the concave side of the dimple that can be seen after assembly, and the actual contact point on the convex side that cannot be seen or measured after assembly. This latter variation can be approximately 0.0005 inch. In addition, measurement repeatability of stamped dimples is poor.

Another method of forming the dimple is to etch the load beam. While the dimple location is accurate relative to the datum holes in the load beam, the etched dimple approach presents several drawbacks, some of which are listed herein. The dimple formed by partially etching the load beam does not form a dome. Rather, its top surface is generally flat and circular. The contact point of the dimple and the flexure cannot be very accurately located, as it can be positioned along the circular top portion of the dimple. Once the suspension is assembled, the dimple location will no longer be measurable since the gimbal will no longer be visible for inspection. Forming of a partial etch area is still required to get the dimple to protrude forward in order to get the separation between the flexure/slider and the load beam, in order to achieve gimbaling.

In another design proposed in U.S. Pat. No. 5,786,961, supra, the suspension includes a load beam having proximal and distal ends and a bearing cover portion. A gimbal on the distal end of the load beam has a flexure pad with a slider-engaging first surface and a second surface opposite the first surface. A ball-receiving hole extends through the flexure pad, and a ball is mounted in the ball-receiving hole. The ball has a load point portion that extends from the second surface of the flexure pad and that engages the bearing cover portion of the load beam. The ball is obscured at assembly, which prevents direct location measurement after assembly, and also prevents viewing from the backside to aid in the assembly.

In yet another design proposed in U.S. Pat. No. 5,381,288, supra, the suspension includes a load beam and a spring assembly that are integrally formed. The spring assembly has a bonding tab suspended within the plane of the load beam by two flexible longitudinal arms connected to two flexible transverse arms. The flexible arms permit the bonding tab to roll about the longitudinal axis and pitch about the transverse axis, while preventing the bonding tab from sticking in an off-axis position. The bonding tab defines an aperture that receives a protuberance of the magnetic head to precisely index the magnetic head with the bonding tab, and thus center the magnetic head about a load support point. This design requires a V-shaped cross-slot to be machined in the slider into which the ball nests for registration.

The foregoing two proposed designs add cost, complexity to the design and assembly of the suspension, and lack optical measurement accessibility after assembly. Therefore, these designs do not appear to be suitable for next generation disk drives where simplicity and low cost will likely become primary considerations for successful head designs.

SUMMARY OF THE INVENTION

The present invention is directed to a head gimbal assembly (HGA) that allows gimbaling along pitch and roll axes, and that utilizes an inexpensive spherical gimbal ball pressed into an etched hole in the load beam to provide a highly accurate, accessible and measurable pivot location of a slider.

The foregoing and other features and advantages of the present invention can be achieved by a new head gimbal assembly design. The head gimbal assembly includes a suspension of the type supporting a slider, and comprising the suspension. A gimbal opening is formed in the load beam, and extends therethrough so that it receives the spherical gimbal ball for attachment to the load beam. A resilient flexure is secured to the load beam and supports the slider. The backside of the gimbal ball remains visible for the option of optical bonding of the slider to the suspension and for measurement of the slider position relative to the gimbal ball subsequent to the assembly of the HGA.

BRIEF DESCRIPTION OF THE DRAWINGS

The features of the present invention and the manner of attaining them, will become apparent, and the invention itself will be understood by reference to the following description and the accompanying drawings, wherein.

Similar numerals in the drawings refer to similar or identical elements. It should be understood that the sizes of the different components in the figures might not be in exact proportion, and are shown for visual clarity and for the purpose of explanation.

DETAILED DESCRIPTION OF THE INVENTION

Figure 1:
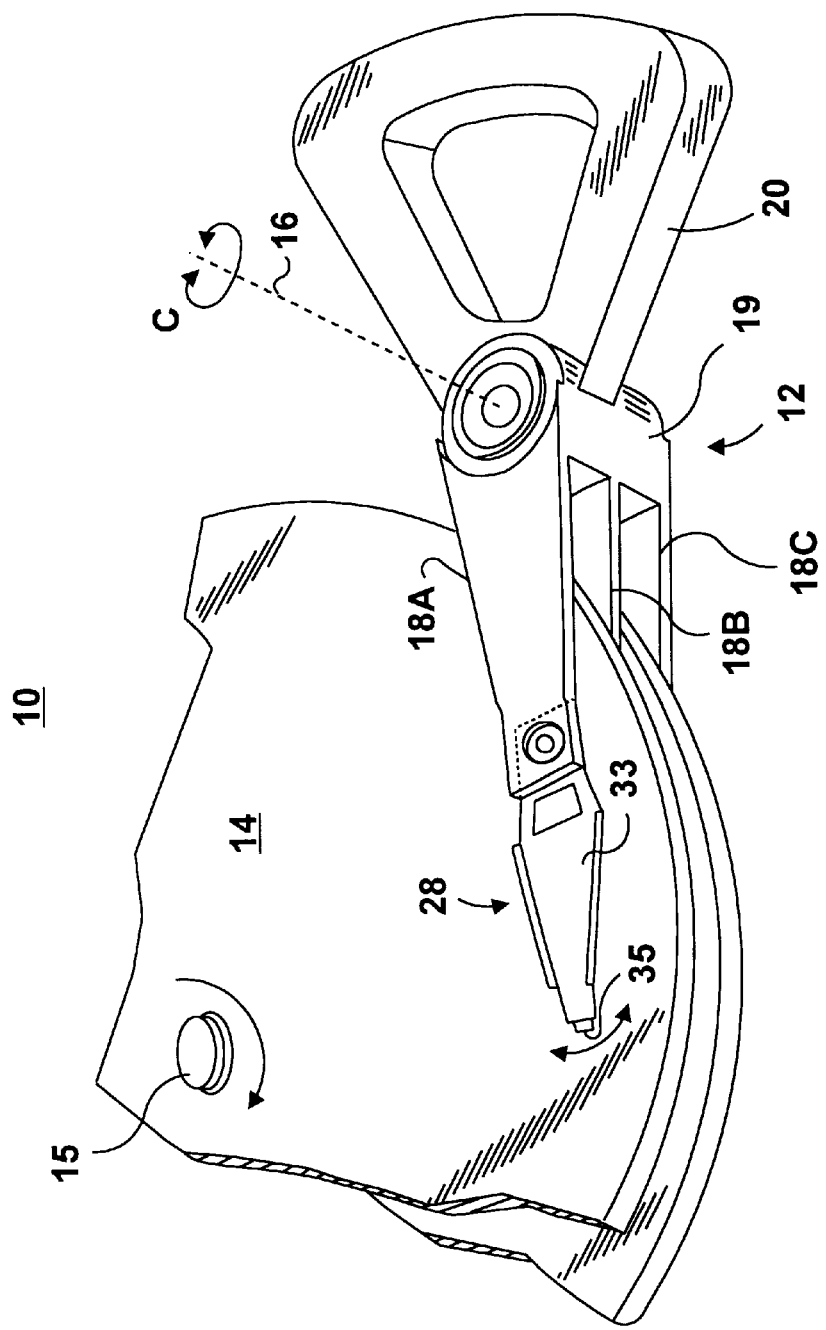
FIG. 1 is a fragmentary isometric view of a data storage system that uses a load beam design incorporating a gimbal ball according to the invention.

FIG. 1 illustrates a disk drive 10 comprised of a head stack assembly 12 and a stack of spaced apart magnetic data storage disks or media 14 that are rotatable about a common shaft 15. The head stack assembly 12 is rotatable about an actuator axis 16 in the direction of the arrow C. The head stack assembly 12 includes a number of actuator arms, only three of which 18A, 18B, 18C are illustrated, which extend into spacings above and below the disks 14.

The head stack assembly 12 further includes an E-shaped block 19 and a magnetic voice coil (or rotor) 20 attached to the block 19 in a position diametrically opposite to the actuator arms 18A, 18B, 18C. A voice coil 20 cooperates with a stator (not shown) for rotating in an arc about the actuator axis 16. Energizing the voice coil 20 with a direct current in one polarity or the reverse polarity causes the head stack assembly 12, including the actuator arms 18A, 18B, 18C, to rotate about the actuator axis 16, in a direction substantially radial to the disks 14.

Figure 2:
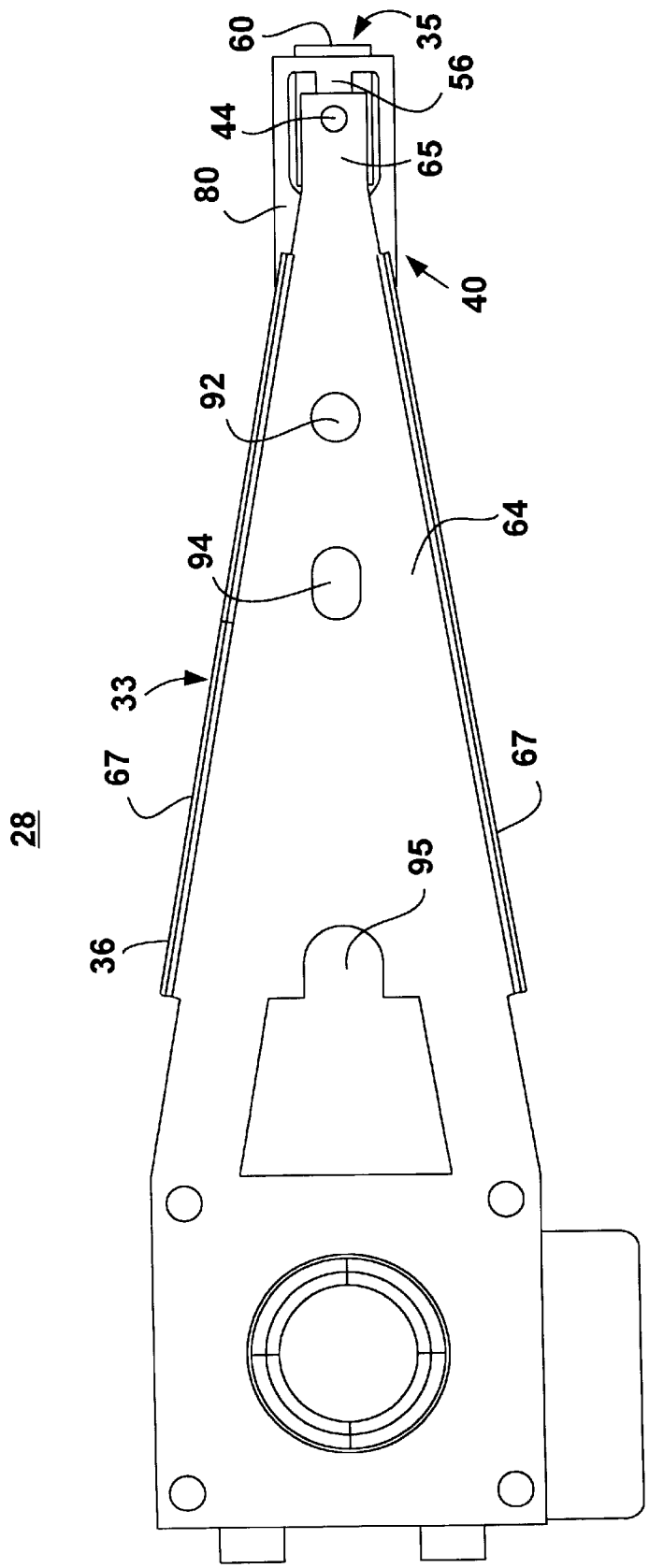
FIG. 2 is a top plan view of an assembled head gimbal assembly comprised of the load beam, a flexure, and a slider, and forming part of the data storage system of FIG. 1, for use in a head stack assembly.
Figure 3:
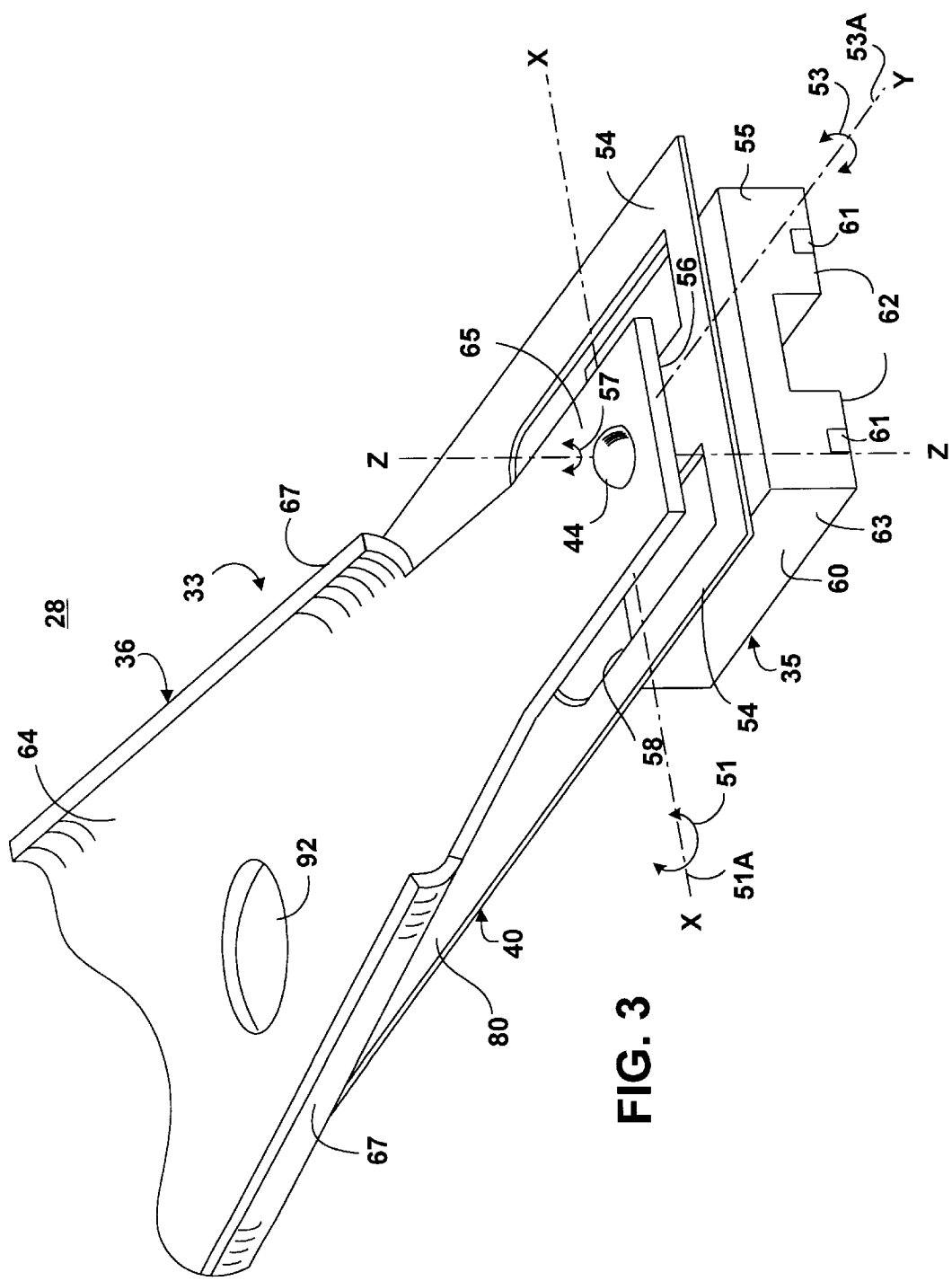
FIG. 3 is an enlarged isometric view of the HGA of FIG. 2, illustrating the disposition of gimbal ball relative to the load beam.

A head gimbal assembly (HGA) 28 is secured to each of the outer actuator arms, for instance 18A and 18C. A pair of HGA's 28 is secured to each inner actuator arm, for instance 18B. With further reference to FIGS. 2 and 3, the HGA 28 is comprised of a suspension (or suspension assembly) 33 and a read/write head 35. The suspension 33 includes a load beam 36, a flexure 40 to which the head 35 is secured, and a gimbal mechanism or ball 44 as it will be described later in greater detail. The head 35 includes a slider 60 and a read/write element 61 secured to a trailing edge 55 of the slider 60.

Figure 5:
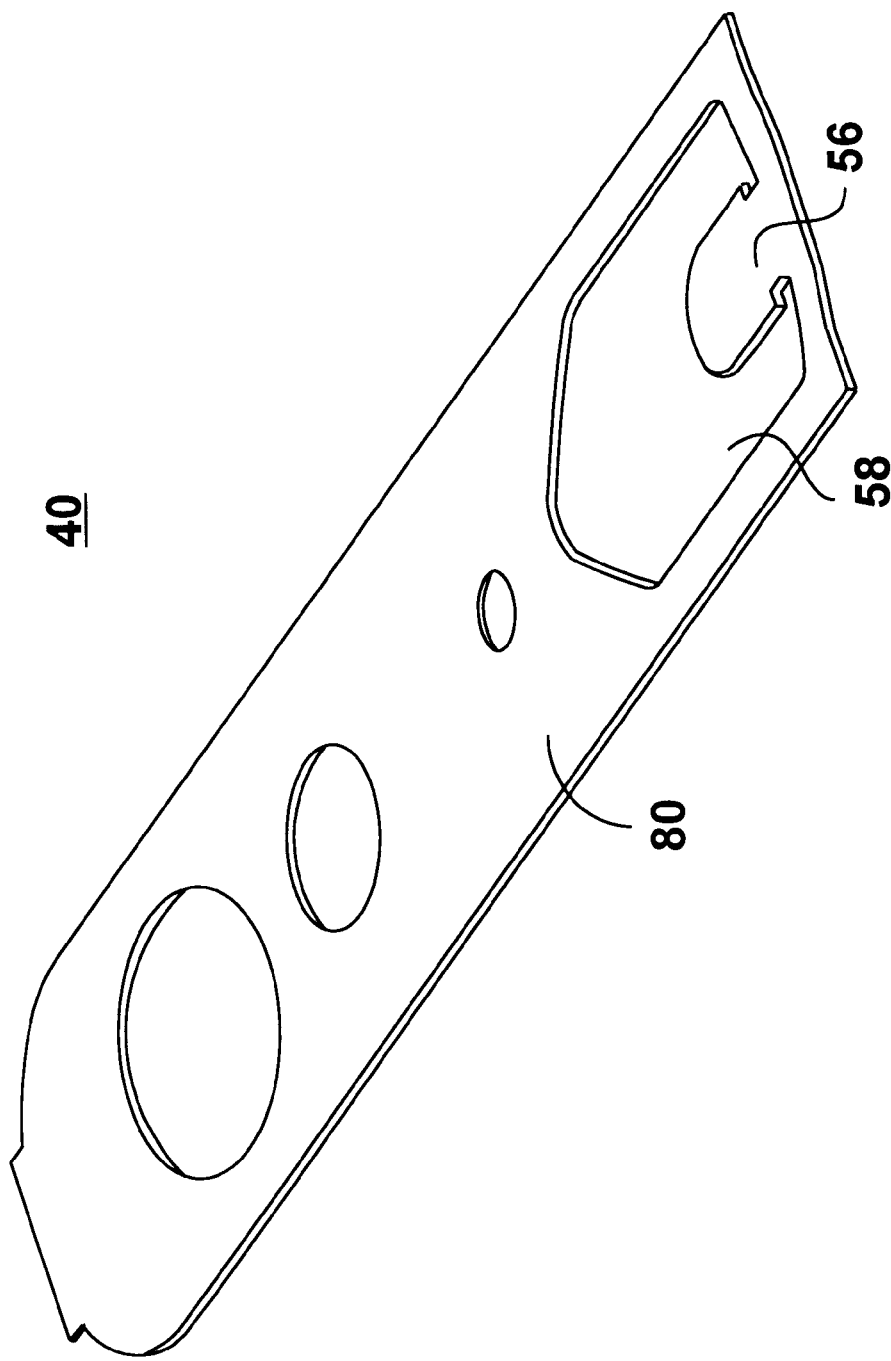
FIG. 5 is an enlarged, isometric view of the flexure of FIG. 2.

With reference to FIGS. 3 and 5, the flexure 40 includes a tongue 56 that extends inwardly, within a clearance 58. The clearance 58 is contoured by a flexure body 80, and two oppositely disposed peripheral ribs or outriggers 54. The outriggers 54 provide the slider 60 with sufficient flexibility in the pitch rotation (illustrated by the arrow 51) about the X-axis 51, and roll rotation (illustrated by the arrow 53) about the Y-axis 53A, for accurate load distribution from the ball 44 pivot point 100 (FIG. 6) to the slider 60 air bearing surface 62, in order to accommodate the uneven topology of the disk surface and other components and drive assembly tolerances, while the slider 60 is flying over the disk 14. The flexure 40 is sufficiently stiff in a yaw direction (illustrated by the arrow 57) to resist deflection parallel to the plane of the disk 14, caused by the rapid movement of the actuator arms 18A, 18B, 18C. The slider 60 is secured to the tongue 56 by means of available techniques, for example UV curable epoxy.

Figure 4:
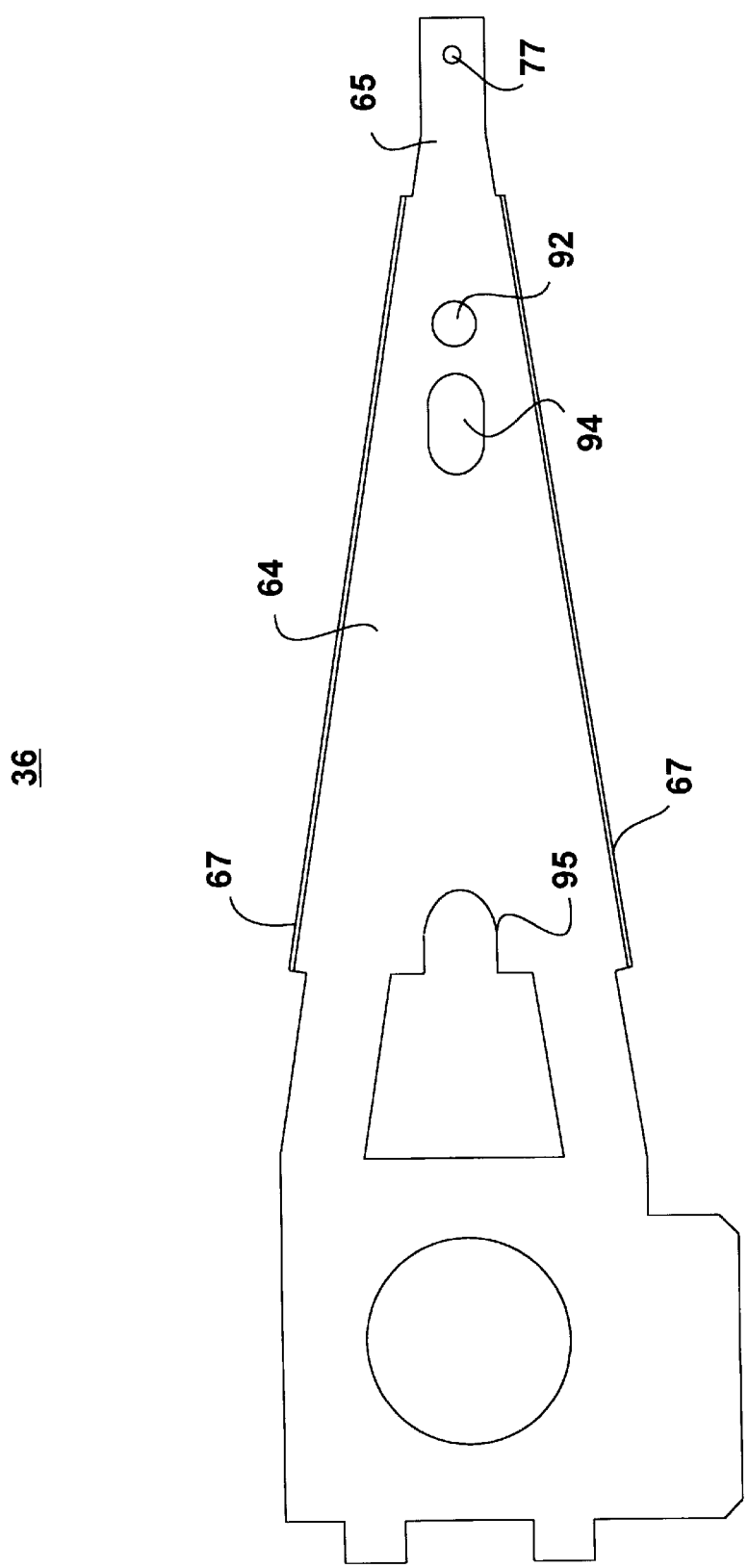
FIG. 4 is a top plan view of the load beam of FIGS. 2 and 3.

FIG. 4 illustrates an exemplary load beam 36. It should be clear that other load beam designs, such as the embodiment illustrated in FIGS. 8, 9, 10, and 11 can alternatively be used. The exemplary load beam 36 includes a main body 64 that extends integrally into a tip 65. The main body 64 includes two peripheral stiffening rails 67.

The tip 65 is generally flat, and includes a gimbal opening 77 through which the spherical gimbal ball 44 is urged, for frictional attachment to the load beam 36, as illustrated in FIGS. 2, 3, 6, and 7. The inner diameter of the gimbal opening 77 is slightly larger than the outer diameter of the gimbal ball 44. The gimbal opening 77 is preferably formed along a central axis of the load beam 36. The gimbal ball 44 has an outer diameter that preferably ranges between approximately 1 mil and 20 mils; however, other values can be selected.

When the gimbal ball 44 is pressed in position through the opening 77, its backside 44B protrudes, at least in part, above the tip (or trailing section) 65, and provides a clear visual indication of the ball 44, for referencing, measurement, and alignment purpose. Such visual accessibility to the gimbal ball 44 represents one of the important aspects of the present invention, in that such feature allows accurate measurement of the ball 44 location, and thus the pivot point 100 location with respect to the slider 60 after assembly. The pivot point 100 location is a critical factor in flying height control of the slider 60.

Figure 6:
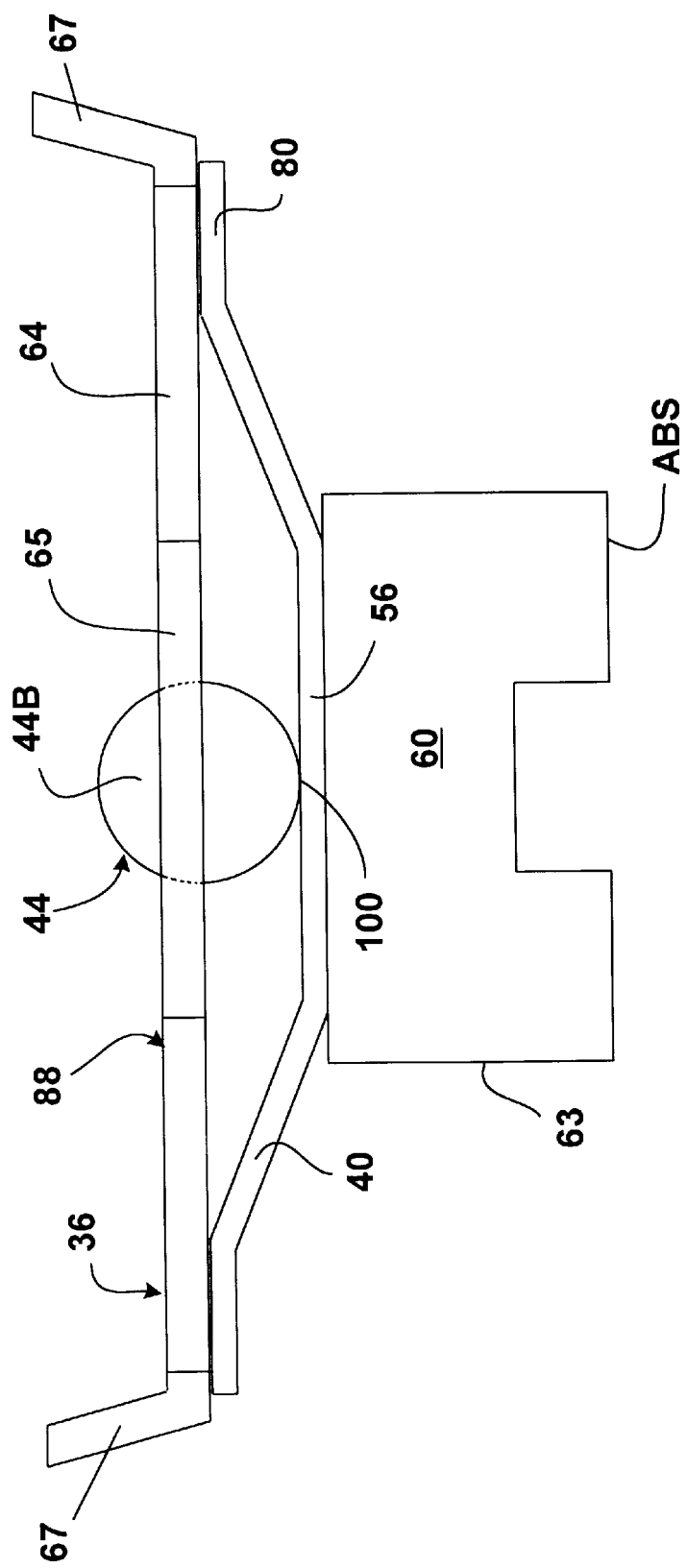
FIG. 6 is a front elevational view of the HGA of FIG. 2.

For mechanical locating, the edges such as the edges 55 and 63 of the slider 60 are positioned mechanically relative to the load beam datum holes 92 and 95, for taking advantage of the improved position of the pivot point 100 relative to the datum holes in the load beam 36, over conventional stamped pivots or dimples. When the head gimbal assembly 28 is assembled, the gimbal ball 44 is urged against the tongue 56 at the contact point 100 (FIG. 6).

Figure 7:
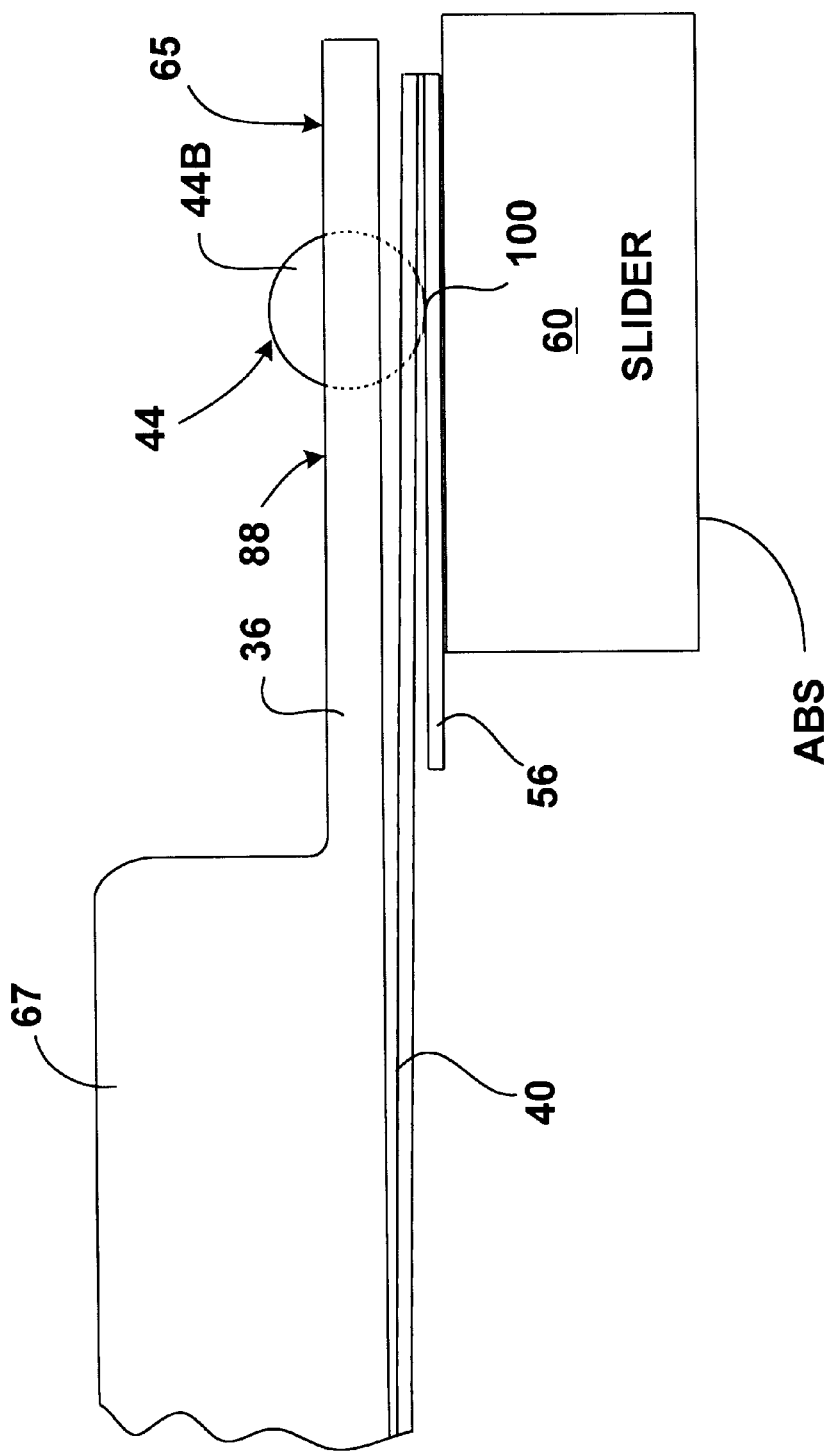
FIG. 7 is a fragmentary, enlarged side elevational view of the HGA of FIGS. 2 and 6, further illustrating the position of the gimbal ball.

The present invention provides several advantages, some of which are mentioned herein. The gimbal mechanism or ball 44 remains accessible, and permits a highly accurate and measurable pivot location in that the backside 44B of the gimbal ball 44 is visible for inspection measurement after assembly of the flexure 40 to the load beam 36 and assembly of the slider 60 to the flexure 40. This represents a significant improvement of prior gimbal assemblies that become inaccessible and hidden from view after assembly. The visibility of the present gimbal ball 44 after assembly is important in that it allows the use of optical and mechanical equipment to accurately measure the ball 44, hence the pivot point 100 with respect to the slider 60 edges 55, 63 from the backside 88 of the load beam 36 (FIGS. 6, 7).

Etching the gimbal ball opening 77 in the load beam 36 at the same time as datum holes 92, 94, 95 (FIGS. 2, 3, 4) yields outstandingly accurate location of the gimbal ball opening 77 relative to the datum holes 92, 94, 95, compared to a stamped dimple, virtually eliminating approximately 0.0007 inch (0.7 mil) etch process to stamping process alignment variation. Furthermore, the gimbal ball 44 self centers when pressed in the opening 77, giving vastly improved control of a pivot point 100 (FIGS. 6, 7) of the gimbal ball 44 relative to the datum holes 92, 94, 95.

The accurate self-centering of the gimbal ball 44 within the hole 77, within a tolerance of, for example, a few microinches, eliminates approximately 0.0005 inch (0.5 mil) variation between the concave side (visible for measurement) and the convex side (actual contact) of a stamped dimple. Additionally, non-spherical shape errors in stamping from wear or foreign material is eliminated.

For optical bonding, the options of viewing the backside 44B of the gimbal ball 44 opposite the slider air bearing surface (ABS) directly, or viewing the datum holes 92, 94, 95 on the same side as the ABS are excellent choices.

Mechanical bonding is enhanced, as well, as a result of the close tolerances between datum holes 92, 94, 95 to the gimbal ball opening 44B, ball sphericity accuracy, and self-centering capability of the gimbal ball 44 in the gimbal ball opening 44B.

Figure 8:
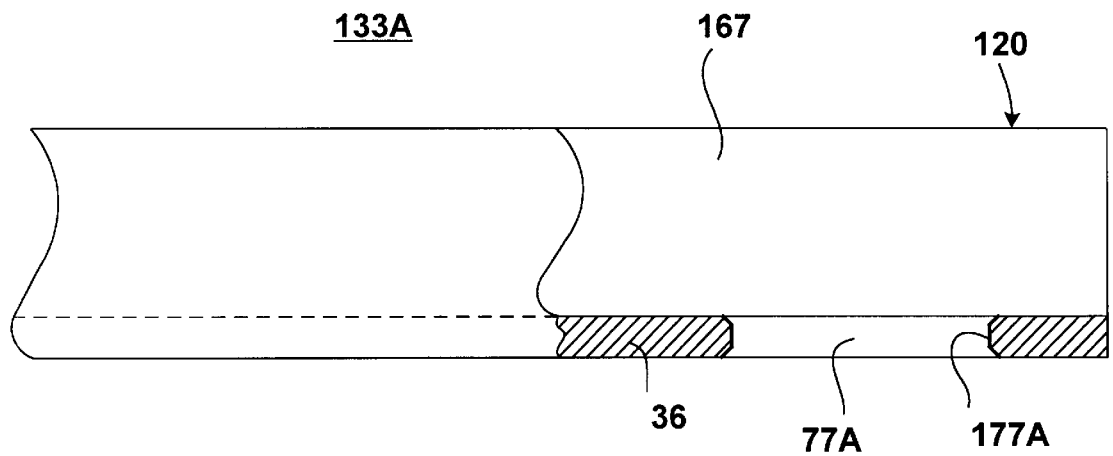
FIGS. 8, 9, 10, and 11 are enlarged, fragmentary, partly sectional, side elevational views of a trailing section of other suspension embodiments, illustrating an opening formed through the load beam to receive the gimbal ball.
Figure 9:
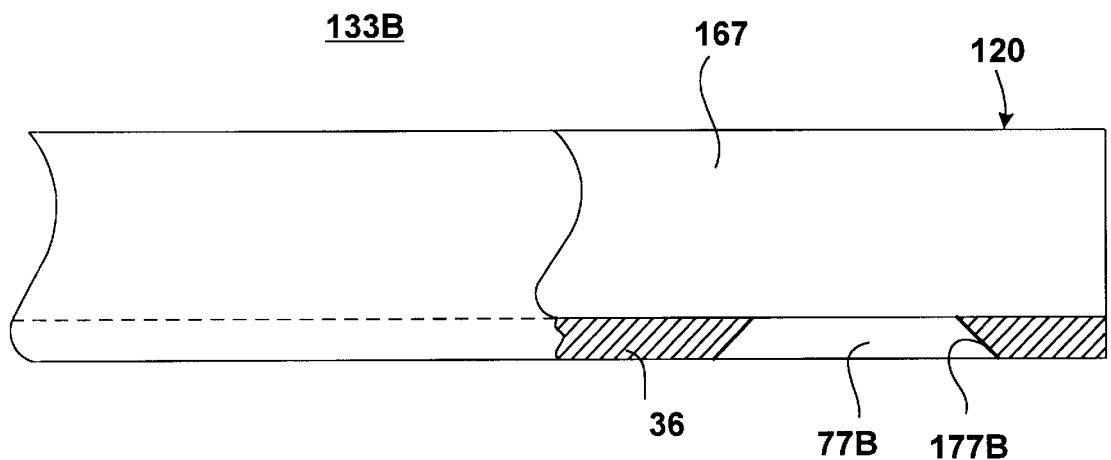

FIGS. 8 and 9 illustrate a tip or trailing section 120 of other suspension 133A, 133B, respectively. The gimbal openings 77A (FIG. 8) and 77B (FIG. 9) are formed through the load beam 36 to receive the gimbal ball 44. The difference between the suspension 33 of FIG. 4 and the suspensions 133A, 133B of FIGS. 8 and 9, is that in suspensions 133A, 133B the rails 167 extend along substantially the entire length of the trailing section 120. It should be clear that in another embodiment the rails 167 extend partially along the length of the trailing section 120.

The suspensions 133A and 133B differ from each other in that the walls 177A, and 177B of the gimbal openings 77A and 77B, respectively, are different. In FIG. 8, the walls 177A taper from both sides as produced from a doubled sided etch process for example. In FIG. 9, the walls 177B taper in one direction to enhance ball retention.

Figure 10:
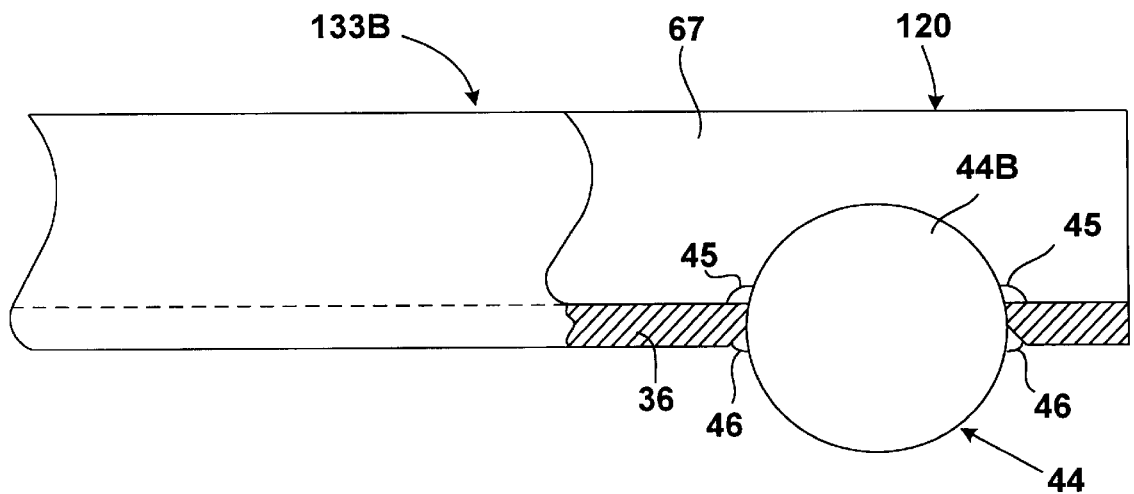

FIG. 10 shows the ball 44 secured in place within the suspension 133B, and illustrates the option of applying adhesive 45 at an inner location, and/or adhesive 46 at an outer location, for added retention of the ball 44 in the load beam 36.

Figure 11:
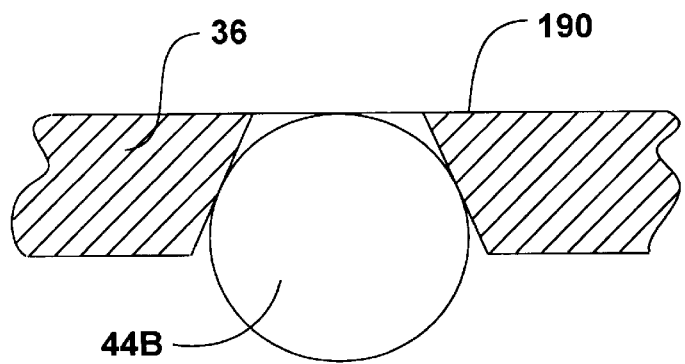

FIG. 11 illustrates the option of securing the ball 44 to the load beam 36, such that the ball 44 does not protrude beyond an upper surface 190 of the load beam 36.

Figure 12:
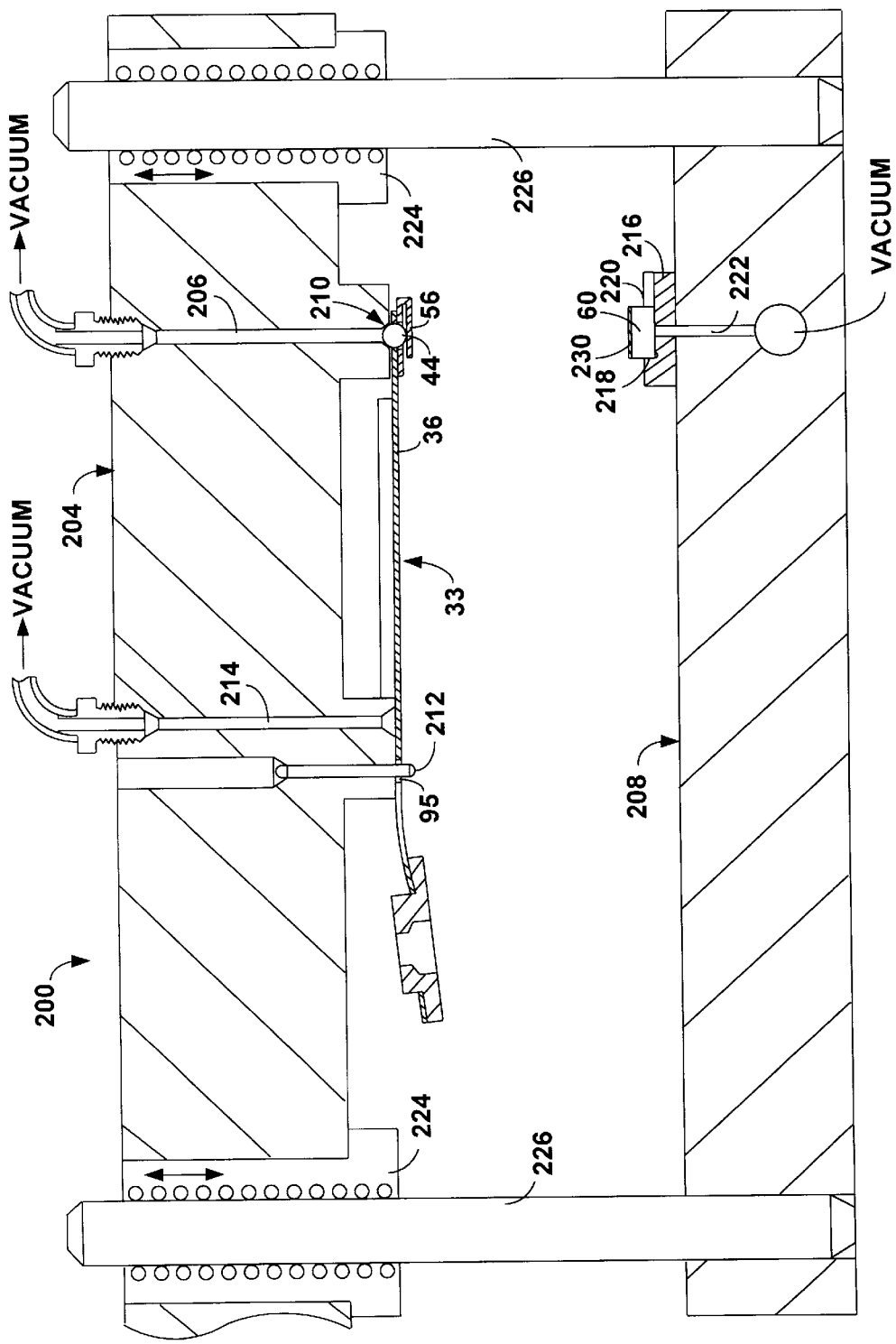
FIG. 12 is a schematic, side, cross-sectional view of an assembly or test fixture of the present invention for assembling and testing the HGA of FIG. 2.
Figure 13:
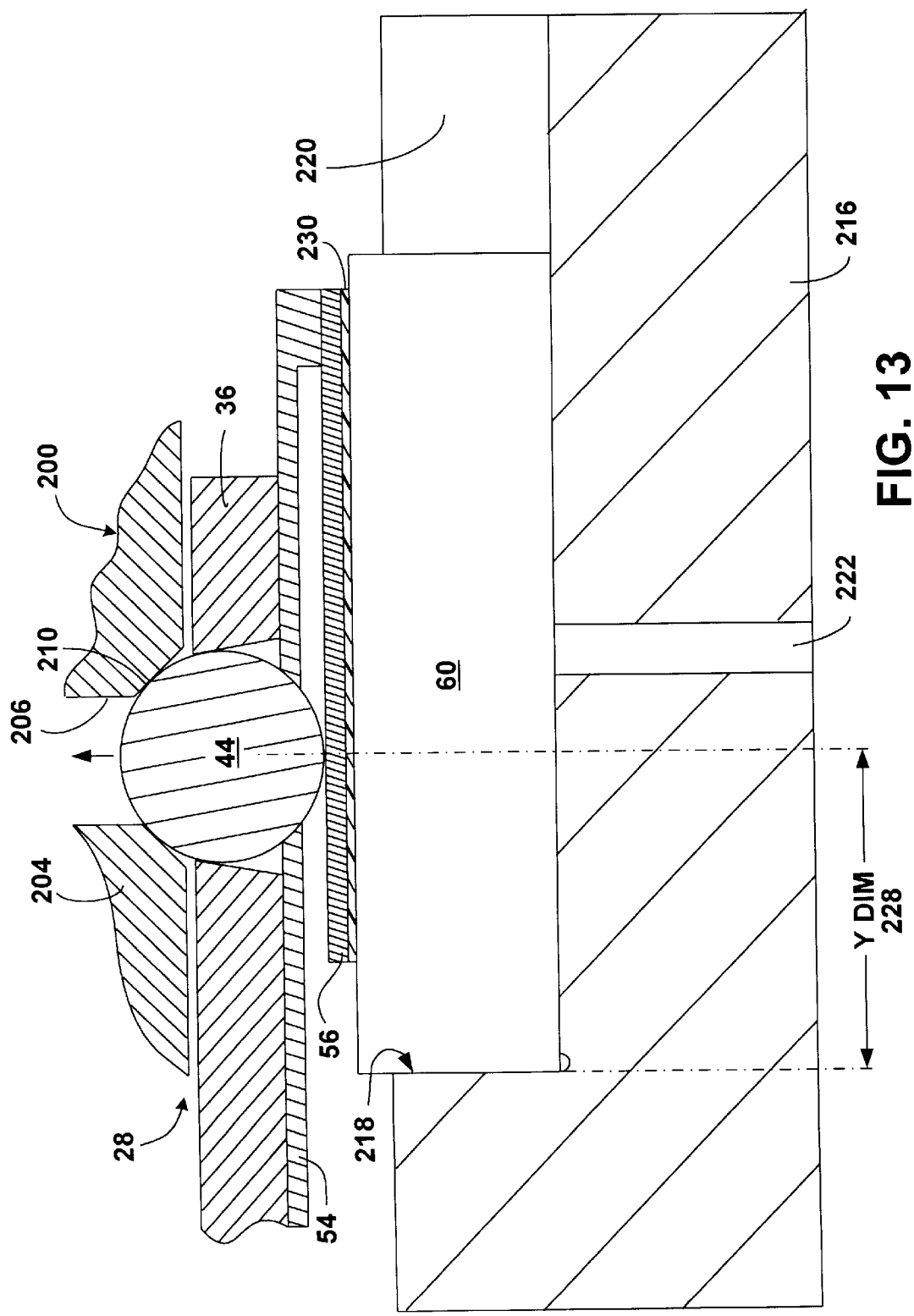
FIG. 13 is an enlarged, partial, cross-sectional view of the head gimbal assembly and fixture of FIG. 12, illustrating the positioning and self-centering of the gimbal ball relative to the slider.

FIGS. 12 and 13 illustrate a unique method for bonding the suspension assembly 33 to the slider 60, using mechanical locating means, referencing directly on the ball 44. An assembly fixture 200 includes a top plate 204 for holding the suspension assembly 33 and a bottom plate 208 for holding the slider 60. The top plate 204 includes a vacuum port 206 that terminates in a chamfered side 210 which mates with the outer contour of the gimbal ball 44. The suspension assembly 33 is placed in the assembly fixture 200 such that vacuum in the vacuum chamber 206 holds the ball 44 seated and self-centered against the chamfered side 210. While placing the suspension assembly 33 in the assembly fixture 200 the load beam datum hole 95 (refer also to FIG. 2) is placed over the locating pin 212. A second vacuum port 214 assists in holding the suspension assembly 33 to the top plate 204.

The slider 60 is placed in a nest 216, which is attached to the bottom plate 208 of the assembly fixture 200. It is located against a Y wall 218 and X wall 220 and held by vacuum in a vacuum port 222 or mechanical clamp (not shown).

After adhesive 230 is applied to the slider 60 or to the tongue 56, the tongue 56 and slider 60 are bonded. FIG. 12 shows the fixture 200 open while FIG. 13 shows a partial view of the fixture 200 closed with the tongue 56 mated and bonded to the slider 60. This mating takes place by lowering the top plate 204 towards the bottom plate 208 until the tongue 56 rests on the slider 60. The top plate 204 contains ball bushings 224 for example, which slide on shafts 226. Shafts 226 are pressed in the bottom plate 208 to ensure repeatable attainment of the Y dim 228 (FIG. 13) and X dim (not shown), and also to ensure that the slider nest 216 is accurately located with respect to the chamfered side 210 of the vacuum port 206 which holds the ball 44 during tooling setup prior to production.

It can be seen that the ball 44 accurately controls the X-Y movement of the Suspension assembly 33 without interplay inside a clearance as is the case with conventional suspensions, which locate a pin in a hole in the suspension. The locating pin 212 in the slot 95 controls the rotation of the suspension about the gimbal ball 44.

The method described herein for direct mechanical locating of the gimbal ball 44 relative to the slider 60, presents several advantages over conventional mechanical locating methods using conventional suspensions, among which are the following advantages: Locating is on the primary X-Y locator (i.e., the gimbal ball) as opposed to a secondary X-Y locator (i.e., a hole in the suspension). The locational tolerance between the stamped dimple and the X-Y locating hole is eliminated. The clearance between the X-Y locator hole and the locating pin is also eliminated.

It should be understood that the above method is only one method of mechanically locating the suspension relative to the slider. If conventional mechanical locating is used, wherein a pin is located in a X-Y locator hole, there is still the advantage of the gimbal ball 44 being accurately located with respect to the X-Y locating hole. This is because the ball hole or gimbal opening 77 is etched at the same time as the X-Y locating hole is etched. Whereas with conventional suspensions, stamping is a separate operation with greater pivot point variation. Direct optical locating of the gimbal ball 44 to the slider is another viable alternative, and would be understood by those familiar with the art.

It should be understood that the geometry, compositions, and dimensions of the elements described herein may be modified within the scope of the invention and are not intended to be the exclusive; rather, they can be modified within the scope of the invention. Other modifications may be made when implementing the invention for a particular environment.

What is claimed is:

1. A suspension for supporting a slider, comprising:
    a load beam in which a gimbal opening is formed and extending therethrough;
    a resilient flexure secured to said load beam and supporting the slider;
    a substantially spherical gimbal ball fitted within said gimbal opening for attachment to said load beam; and
    wherein said gimbal ball includes a backside that remains visible after assembly of the slider to said suspension for allowing accurate measurement of a pivot point with respect to the slider from a backside of the load beam.

2. A suspension according to claim 1, wherein said flexure includes a tongue to which the slider is secured.

3. A suspension according to claim 1, wherein said backside protrudes beyond said load beam.

4. A suspension according to claim 1, wherein said backside does not protrude beyond said load beam.

5. A suspension according to claim 1, wherein said gimbal ball has an outer diameter that ranges between approximately 1 mil and 20 mils.

6. A suspension according to claim 1, wherein said load beam includes at least one datum hole formed simultaneously with, and referenced relative to said gimbal opening.

7. A suspension according to claim 1, further including adhesive that assists in the retention of said gimbal ball to said load beam.

8. A suspension according to claim 1, further including forming said gimbal opening along a central axis of said load beam.

9. A method of making a suspension for supporting a slider, comprising:
    forming a gimbal opening in a load beam;
    positioning a substantially spherical gimbal ball within said gimbal opening for attachment to said load beam;
    forming a resilient flexure;
    securing said flexure to said load beam for supporting the slider; and
    using a visible backside of said gimbal ball as an optical point of reference, for allowing accurate measurement of a pivot point with respect to the slider from a backside of the load beam.

10. A method according to claim 9, wherein positioning the gimbal ball includes preventing the backside from protruding beyond said load beam.

11. A method according to claim 9, wherein positioning the gimbal ball includes causing the backside to protrude beyond said load beam.

12. A method according to claim 9, further including using adhesive to assist in the retention of said gimbal ball to said load beam.

13. A method according to claim 9, further including referencing one datum hole of said load beam relative to said gimbal opening.

14. A method according to claim 13, wherein referencing the datum hole of said load beam includes fixedly retaining said gimbal ball by means of a fixture.

15. A head gimbal assembly including a suspension of the type supporting a slider, the suspension comprising:
    a load beam in which a gimbal opening is formed and extending therethrough;
    a resilient flexure secured to said load beam and supporting the slider;
    a substantially spherical gimbal ball fitted within said gimbal opening for attachment to said load beam; and
    wherein said gimbal ball includes a backside that remains visible after assembly of the slider to said head gimbal assembly, for allowing accurate measurement of a pivot point with respect to the slider from a backside of the load beam.

16. A head gimbal assembly according to claim 15, wherein said flexure includes a tongue to which the slider is secured.

17. A head gimbal assembly according to claim 15, wherein said load beam includes a tip; and
    wherein said gimbal opening is formed in said tip, along a central axis.

18. A head gimbal assembly according to claim 15, wherein said load beam includes at least one datum hole which is referenced relative to said gimbal opening.

* * * * *